US010601815B2

(12) United States Patent
Salmela et al.

(10) Patent No.: US 10,601,815 B2
(45) Date of Patent: Mar. 24, 2020

(54) METHODS AND DEVICES FOR BOOTSTRAPPING OF RESOURCE CONSTRAINED DEVICES

(71) Applicant: Telefonaktiebolaget LM Ericsson (publ), Stockholm (SE)

(72) Inventors: Patrik Salmela, Espoo (FI); Mohit Sethi, Espoo (FI); Ari Keränen, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 301 days.

(21) Appl. No.: 15/036,685

(22) PCT Filed: Nov. 15, 2013

(86) PCT No.: PCT/SE2013/051344
§ 371 (c)(1),
(2) Date: May 13, 2016

(87) PCT Pub. No.: WO2015/072899
PCT Pub. Date: May 21, 2015

(65) Prior Publication Data
US 2016/0294819 A1    Oct. 6, 2016

(51) Int. Cl.
*H04L 9/08*    (2006.01)
*H04L 29/06*   (2006.01)
(Continued)

(52) U.S. Cl.
CPC ........ *H04L 63/0853* (2013.01); *H04L 9/0838* (2013.01); *H04W 4/50* (2018.02);
(Continued)

(58) Field of Classification Search
CPC .................................................. H04L 63/0853
See application file for complete search history.

(56) References Cited

U.S. PATENT DOCUMENTS

2006/0182280 A1*   8/2006   Laitinen .................. H04L 63/06
                                                             380/247
2010/0185849 A1*   7/2010   Rune ..................... G06F 21/445
                                                             713/156
(Continued)

FOREIGN PATENT DOCUMENTS

EP         2 654 332 A1    10/2013
WO     WO 2013/113162 A1    8/2013

OTHER PUBLICATIONS

3GPP, Technical Report—"3rd Generation Partnership Project; Technical Specification Group Services and System Aspects; Feasibility study on the security aspects of remote provisioning and change of subscription for Machine to Machine (M2M) equipment (Release 9)", 3GPP TR 33.812 V9.2.0 (Jun. 2010), 87 pp.
(Continued)

*Primary Examiner* — Josnel Jeudy
(74) *Attorney, Agent, or Firm* — Sage Patent Group

(57) ABSTRACT

It is disclosed a method of establishing a secure connection between a device and a network-based entity, NAF, via an access gateway, where the device and a network-based bootstrapping server, BSF, have a pre-established trust relationship. The method comprises the access gateway acting as a proxy between the device and the BSF. A reference to a NAF received from the BSF is used to securely authenticate the device to the NAF. An identity of the access gateway is sent to the NAF and the identity is used to authorise the device to use the access gateway. The access gateway identity is authenticated at the BSF and/or the NAF. The access gateway may relay messages to the device over a non-HTTP link.

23 Claims, 9 Drawing Sheets

(51) Int. Cl.
  *H04W 4/70* (2018.01)
  *H04W 4/50* (2018.01)
  *H04W 4/60* (2018.01)
  *H04W 12/04* (2009.01)

(52) U.S. Cl.
  CPC .............. *H04W 4/60* (2018.02); *H04W 4/70* (2018.02); *H04W 12/04* (2013.01); *H04W 12/04031* (2019.01); *H04L 63/0884* (2013.01); *H04L 2209/80* (2013.01)

(56) References Cited

U.S. PATENT DOCUMENTS

2013/0290723 A1* 10/2013 Yu ........................... H04W 4/70
  713/171
2013/0305040 A1* 11/2013 Lee ......................... H04L 9/083
  713/155

OTHER PUBLICATIONS

3GPP, Technical Specification—"3rd Generation Partnership Project; Technical Specification Group Services and System Aspects; 3G Security; Security architecture (Release 11)", 3GPP TS 33.102 V11.5.0 (Dec. 2012), 76 pp.

3GPP, Technical Specification—"3rd Generation Partnership Project; Technical Specification Group Services and System Aspects; Generic Authentication Architecture (GAA); Generic Bootstrapping Architecture (GBA) (Release 11)", 3GPP TS 33.220 V11.1.0 (Dec. 2011), 74 pp.

International Search Report, Application No. PCT/SE2013/051344, dated Jul. 10, 2014.

Written Opinion of the International Searching Authority, Application No. PCT/SE2013/051344, dated Jul. 10, 2014.

Barriga et al., "M2M Remote-Subscription Management", *Ericsson Review*, 1, 2011, 6 pp.

China Mobile, "Secure connection—GBA based solution consideration", Agenda Item: 7.9, Document for Discussion, S3-130658, 3GPP TSG SA WG3 Meeting #72, Qingdao, China, Jul. 8-12, 2013, 10 pp.

Ericsson, "GBA for constrained devices", Document for: Approval, Agenda Item: 7.9 MTC, Work Item/Release: Rel-12 MTCe, S3-131056, 3GPP TSG SA WG3 (Security) Meeting #73, San Francisco, CA, US, Nov. 11-15, 2013, 3 pp.

* cited by examiner

METHODS AND DEVICES FOR BOOTSTRAPPING OF RESOURCE CONSTRAINED DEVICES

CROSS REFERENCE TO RELATED APPLICATION

This application is a 35 U.S.C. § 371 national stage application of PCT International Application No. PCT/SE2013/051344, filed on Nov. 15, 2013, the disclosure and content of which is, incorporated by reference herein in its entirety. The above-referenced PCT International Application was published in the English language as International Publication No. WO 2015/072899 A1 on May 21, 2015.

TECHNICAL FIELD

The present invention relates to a bootstrapping architecture for resource constrained devices such as, for example, Machine-to-Machine devices.

BACKGROUND

There is currently a drive to introduce wired and wirelessly connected devices across a host of new applications. These devices might, for example, act as remote sensors to sense environmental conditions. For example, an operator of a fleet of refrigerated trucks might deploy such devices to sense and report temperature, humidity, etc, across the fleet. Devices on a given truck may communicate, with the operator's control centre via a wireless gateway (e.g. 3G or 4G) in the truck's cab. In another example, a home owner might deploy a range of different devices to monitor conditions and control other devices around the home. These might communicate, e.g. with the Internet, via a 3G or 4G gateway, WiFi router, etc. In yet another example, internal or external body mounted sensors may be used to monitor physiological data such as heart rate, blood sugar level, etc, with data being transmitted to and from internet servers via a user's 3G or 4G smartphone. Such devices are commonly referred to as "Machine-to-Machine" (M2M) devices to indicate that they provide a means for machine-to-machine communication in contrast to traditional mobile devices (e.g. UEs) whose primary function is to provide person-to-person communication. The ecosystem incorporating M2M devices has been referred to as the "Internet of Things" (IoT).

A prime requirement of M2M devices is that they be small, lightweight, and cost effective (i.e. relatively cheap) in order to facilitate their widespread use: it is estimated that in years to come there might be as many as 50 billion such connected devices. These requirements necessarily mean that a typical M2M device will be severely resource constrained, certainly as compared to a conventional UE.

For IoT/M2M systems, the numbers of devices that will need to be managed will be very large, which makes the usability of the management solution an important factor. Consider for example the case of a truck fleet operator having several hundred lorries, each with multiple M2M devices. A natural solution is to have a centralized device management point, for example a management web portal, to which the devices register and from which the devices are managed (instead of managing each device directly and individually), as well as a central data management point that is used to manage M2M data.

In addition to managing the functionality and reporting of M2M devices in a given network, the connectivity of these devices also needs to be managed, especially when the M2M devices are 3GPP capable nodes, i.e. they have their own 3GPP subscription credentials. This might be achieved, for example, using a cloud service, deployed within a cellular telephone network operator's network or as a virtual cellular network (core network). Through a platform such as this, an enterprise or even a user can manage the 3GPP subscriptions of their devices, e.g. ordering SIM cards/credentials, enabling devices etc.

Many resource-constrained M2M devices are manufactured with 3GPP credentials. These credentials may be on the device in the form of a conventional SIM card (UICC), or, as in the case of the vehicle industry, in the form of embedded UICC (eUICC), or may be part of a TRusted execution Environment (TRE) as discussed in Barriga, Luis, BEN SMEETS, and KRISTER SALLBERG. "M2M Remote-Subscription Management." Ericsson Review 1 (2011). This use of 3GPP credentials introduces the possibility of using 3GPP Generic Bootstrapping Architecture (GBA) defined in 3GPP TS 33.220 to set up a shared secret between an M2M device and an application server (referred to as Network Application Function (NAF)). In the context of IoT/M2M, the application server may be, for example, the central device management point or central data f management point referred to above. GBA is illustrated in FIGS. 1 and 2 and will be discussed further below.

As described in 3GPP TS 33.220, GBA allows devices with 3GPP credentials to authenticate themselves to the operator and also set up shared secret keys with other application servers (NAF) on the Internet. According to the existing standards, the devices with 3GPP credentials need to support HTTP and TCP stacks. This is not optimal for all resource-constrained M2M devices as, in a real-world scenario, these M2M devices might rely on more energy-efficient and compact M2M specific application protocols, such as CoAP rather than HTTP, and might rely on UDP instead of TCP for the transport layer (e.g. to reduce power consumption and memory requirements). In some even more constrained environments, M2M devices may only perform elementary routing with Routing Protocol for Low power and Lossy Networks (RPL), leaving the task of transport layer encapsulation and data delivery to a Gateway (GW) having more resources. Either way, it is not efficient to implement the full HTTP/TCP stacks for M2M devices, when the only requirement for these protocols is the GSA, and only minimal state information is required after a GBA run (ideally only B-TID, Ks and KsNAF need to be saved, see FIG. 2).

Moreover, the problem of securely discovering a gateway (secure pairing) by a constrained device in the presence of adversaries is a common problem. This problem is enhanced in an M2M ecosystem where there are several players and different manufacturers involved. Discovering the management portal (device management service) to be used by the devices is an issue that needs to be addressed when dealing with a large set of devices.

SUMMARY

According to a first aspect of the present invention there is provided a method of establishing a secure connection between a device and a network-based entity via an access gateway, where the device and a network-based bootstrapping sewer have a pre-established trust relationship. The method comprises sending a bootstrapping initiation request from the device to the access gateway and, upon receipt of the bootstrapping initiation request at the access gateway, forwarding the request to the bootstrapping server. The request is received at the bootstrapping server, and a reference to the network-based entity obtained. A response, including the reference, is sent to the device via the access gateway. The method comprises using the reference to the network-based entity to securely authenticate the device to the network-based entity, and sending an identity of the access gateway to the network-based entity and using that identity to authorise the device to use the access gateway. The method further comprising sending, from the gateway to one or both of the bootstrapping server and the network-based entity, a proof of the access gateway identity, and using the proof of identity to authenticate the access gateway identity at the bootstrapping server and/or the network-based entity.

According to a second aspect of the present invention there is provided an access gateway comprising a first interface enabling communication with a device, and a second interface enabling communication with a bootstrapping server. The gateway comprises a receiver for receiving from said device, via said first interface, a bootstrapping initiation request, and a request handier for including in said request a gateway identity and a proof of that identity. The gateway further comprises a sender for sending the request to said bootstrapping server via said second interface, and a relay for relaying a response, received from said bootstrapping server via said second interface, to said device via said first interface. The response contains a pointer to a network-based entity and an access gateway authentication result.

According to a third aspect of the present invention there is provided a device comprising a memory for storing 3GPP credentials or an interface to an external device for obtaining results from processing of the 3GPP credentials (for example authentication), and an interface for communicating with an access gateway using non-HTTP protocols. The device further comprises a bootstrapping entity for using said interface to obtain a reference to a network-based entity from a bootstrapping server, using said 3GPP credentials, and for using the obtained reference to establish a secure connection with a network-based entity.

According to a fourth aspect of the present invention there is provided a server configured to operate as a Bootstrapping Server Function within a Generic Bootstrapping Architecture. The server comprises an interface for communicating with an access gateway acting as an access gateway for devices. The server further comprises a receiver for receiving from said access gateway, via said interface, a GBA bootstrapping initiation request relating to a device containing an identity of said gateway and a proof of that identity, and a request handler for authenticating the gateway identity using the proof of identity and for notifying the device of a gateway authentication result, via said interface and said access gateway, as part of a GBA exchange.

According to a fifth aspect of the present invention there is provided a network-based entity operating as a Network Access Function within a Generic Bootstrapping Architecture. The entity comprises an interface for communicating with an access gateway for devices, the entity comprising a receiver for receiving, via said interface, an identity of the access gateway, and an authorising unit for authorising the gateway for use by the devices based on said identity.

According to a sixth aspect of the present invention there is provided a method of operating an access gateway. The method comprises receiving from a device, a bootstrapping initiation request, including in said request a gateway identity and a proof of that identity, and sending the request to a bootstrapping server. The method further comprises relaying a response, received from said bootstrapping server via said second interface, and containing a pointer to a network-based entity and an access gateway authentication result, to said device via said first interface.

According to a seventh aspect of the present invention there is provided a method of operating a device comprising a memory storing 3GPP credentials or having an interface to an external device for obtaining results from processing of the 3GPP credentials (for example authentication). The method comprises communicating with an access gateway using non-HTTP protocols in order to obtain a reference to a network-based entity from a bootstrapping server, using said 3GPP credentials, and using the received identity to establish a secure connection with a network-based entity.

According to an eighth aspect of the present invention there is provided a method of operating a server configured to operate as a Bootstrapping Server Function within a Generic Bootstrapping Architecture. The method comprises receiving from an access gateway, a GBA bootstrapping initiation request relating to a given device containing an identity of said gateway and a proof of that identity, authenticating the gateway identity using the proof of identity, and notifying the device of a gateway authentication result, via said access gateway, as part of a GBA exchange.

According to a ninth aspect of the present invention there is provided a method of operating a network-based entity operating as a Network Access Function within a Generic Bootstrapping Architecture. The method comprises communicating with an access device acting as an access gateway for devices, in order to receive an identity of the access gateway, and authorising the gateway for use by the device based on said identity.

Embodiments of the present invention may be used to provide an M2M device that can securely bootstrap with an authorized and verified GW. The device is able to find the correct device management service, and determine if the used gateway is authorised by the device management service.

According to a further aspect of the present invention there is provided a method of establishing a secure connection between a device and a network-based entity via an access gateway. The method comprises sending a Generic Bootstrapping Architecture, GBA, initiation request from the device to the access gateway and, upon receipt of the GBA initiation request at the access gateway, attaching an identity of the gateway and a proof of identity to the request and forwarding if to a Bootstrapping Server Function, BSF. The method further comprises performing Authentication and Key Agreement between the device and the BSF, including relaying, via the gateway, challenge, response and acknowledgement messages in order to provision the device with a master key for use with said network-based entity acting as a Network Application Function, NAF, including using the gateway identity and proof of identity to authenticate the gateway at the BSF and, following a successful authentication, notifying the device of the authenticated gateway identity, and securely sending the authenticated gateway identity from the device to the network-based entity and authorising the gateway on the basis of this authenticated gateway identity.

According to a still further aspect of the present invention there is provided a method of establishing a secure connection between a device and a network-based entity via an access gateway. The method comprises sending a Generic Bootstrapping Architecture, GBA, initiation request from the device to the access gateway, and, upon receipt of the GBA initiation request at the access gateway, establishing a TCP connection between the access gateway and a Bootstrapping Server Function, BSF, allocated to the device. The method further comprises performing Authentication and Key Agreement between the access gateway and the BSF using HTTP over said TCP connection, including relaying challenge, response and acknowledgement messages between the access gateway and the device over a non-HTTP link in order to provision the device with a master key for use with said network-based entity acting as a Network Application Function, NAF.

The method may comprise establishing a TCP connection between the access gateway and network-based entity and using HTTP over said connection in order to send a session B-TID from the device to the network-based entity, which the network-based entity can use for obtaining a network-based entity specific key from the BSF.

The method may comprise including a gateway identity and associated proof of that identity in the AKA initial bootstrapping request sent by the access gateway to the BSF, and, at the BSF, using said proof of identity to authenticate the access gateway, and notifying the device of the result.

The method may comprise, at the BSF, in response to receipt of the AKA initial bootstrapping request, obtaining an identity of the network-based entity and including this in the 200 OK response containing the B-TID that is sent to the device via the access gateway. Said identity of the network-based entity may be a Fully Qualified Domain Name, FQDN. The method may comprise including said gateway identity in said 200 OK response, securely communicating the gateway identity from the device to the network-based entity, and authorising the gateway at the network-based entity using the communicated gateway identity.

Further aspects of the present invention are set out in the appended claims.

DETAILED DESCRIPTION

Figure 1:
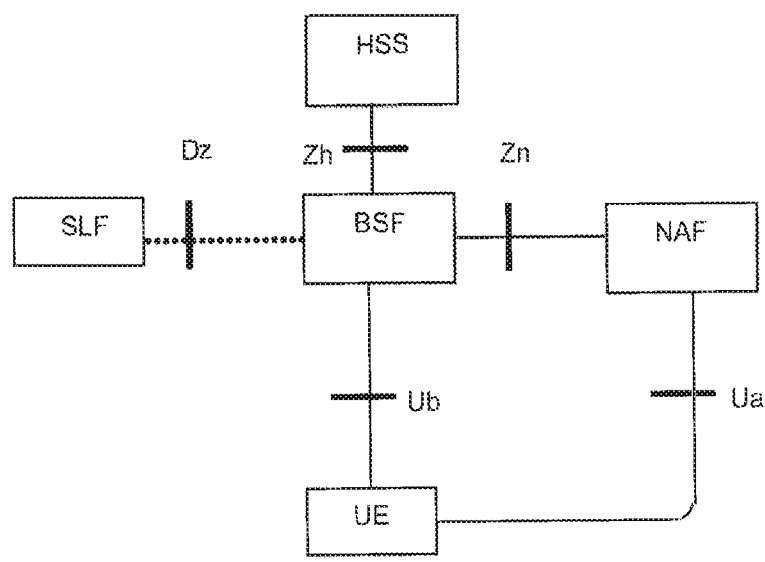
FIG. 1 illustrates schematically an example of a simple network model for the GBA.

In order to facilitate the provision of secure and trusted services to user terminals, a mobile network such as a 3G or 4G network should support the establishment of a secure communication channel or "security association" between client terminals (i.e. mobile terminals) and the network-based service nodes which provide the services. The Generic Bootstrapping Architecture (GBA) defined in the 3GPP Technical Specification TS 33.220 V11.1.0 (2011-12) provides a mechanism whereby a client terminal (UE) can be authenticated to a Network Application Function (NAF) (i.e. an Application Server), and secure session keys obtained for use between the client terminal and the NAF. FIG. 1 illustrates schematically an example of the simple network model for the GBA, as described in 3GPP TS 33.220, which comprises a Bootstrapping Server Function (BSF), a Network Authentication Function (NAF), a Subscriber Locator Function (SLF), a Home Subscriber System (HSS) and the User Equipment (UE). Communication between the MAP and the UE takes place over reference point Ua, communication between the NAF and the BSF takes place over reference point Zn, communication between the UE and the BSF takes place over reference point Ub, communication between the BSF and the HSS takes place over reference point Zh and communication between the BSF and the SLF takes place over reference point Dz.

Figure 2:
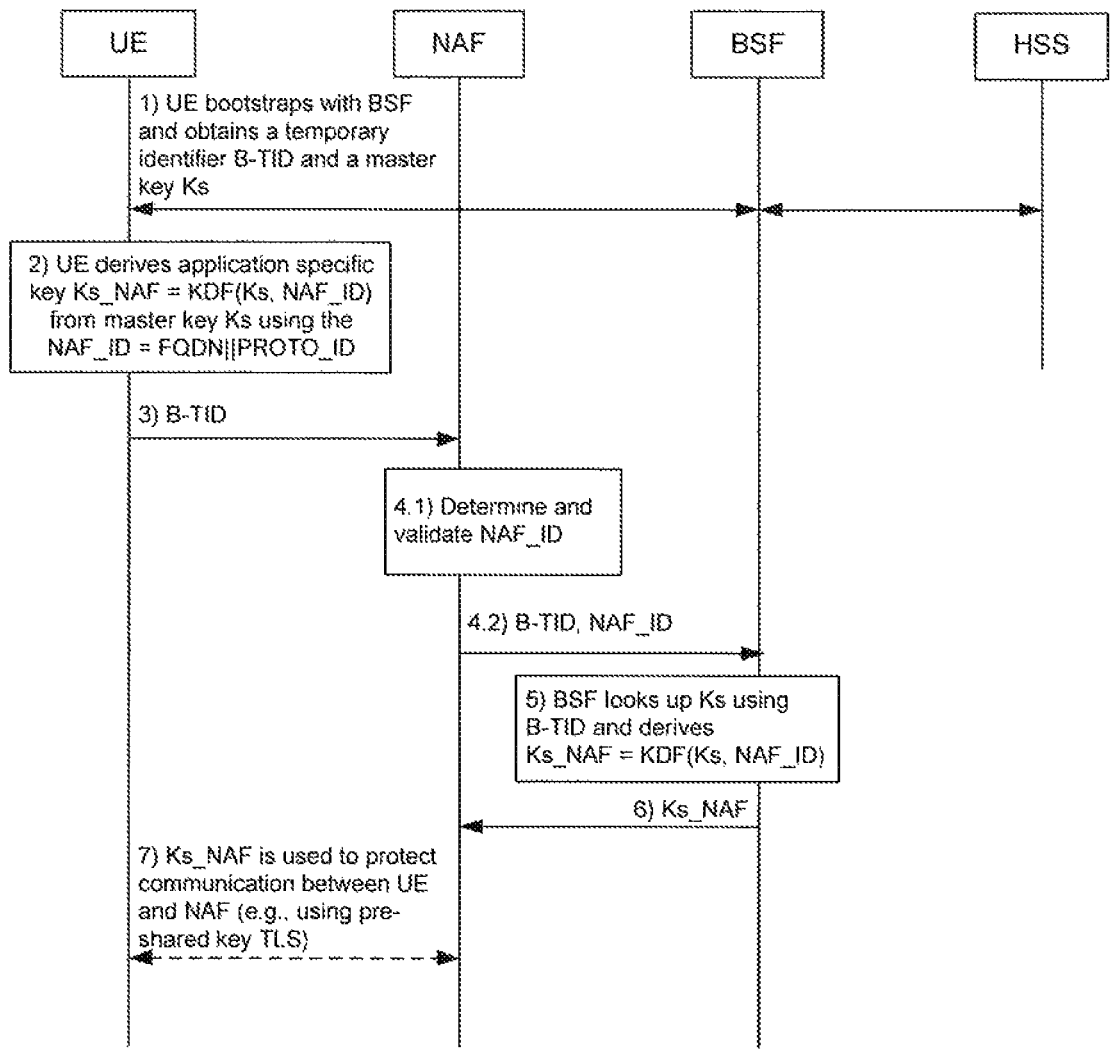
FIG. 2 illustrates an example signaling flow of a bootstrapping and key derivation mechanism provided by the GBA.

When the UE wishes to contact a NAF and no security association between the UE and the NAF has been established at an earlier stage, the UE may contact the NAF with a request for communication and the request may not include any GBA-related parameters, if the NAF requires the use of a security association obtained by means of the GBA, the NAF may respond to the UE with a bootstrapping initiation "trigger" message. [HTTP 401 message (authentication required) with the realm parameter containing, as the prefix, "3GPP bootstrapping@".] The UE will then start a bootstrapping procedure with the BSF. The GBA provides a mechanism to bootstrap the Authentication and Key Agreement (AKA) for application security from the 3GPP AKA mechanism described in 3GPP TS 33.102 (version 11.5.0 2012 Dec. 21). This mechanism allows a UE to be authenticated to a BSF and to obtain a master key (Ks) and a Bootstrapping Transaction identifier (B-TID). GBA User Security Settings (GUSS) is a set of all user security settings and is stored in the HSS, During the bootstrapping procedure, the BSF obtains the GUSS from the HSS. The GUSS can contain information about the subscription, for example usage policies and also service specific settings such as the username to use in a specific service (MAP). This can be communicated to the NAF together with KsNAF (see below), if no other username is communicated, the device will be known in the NAF either by B-TID (which will change for each bootstrap) or possibly by the international Mobile Subscriber Identity (IMSI) if provided by the BSF together with the KsNAF. The bootstrapping procedure is indicated in FIG. 2 as step 1).

The master key Ks is shared between the UE and the BSF, but not with the NAF. Instead, an application specific key Ks_NAF is derived by the UE. The derivation of Ks_NAF is based on Ks and a NAF_ID, whereby the NAF_ID is constructed by a concatenation of a Fully Qualified Domain Name (FQDN) of the NAF and a security protocol identifier of reference point Ua. The derivation of Ks_NAF is described in 3GPP TS 33.220 and indicated in FIG. 2 as step 2).

The UE then supplies the B_TID to the NAF over reference point Ua in an application request. This step is indicated in FIG. 2 as step 3). After receipt of the application request at the NAF, the NAF determines the NAF_ID and verifies that the user is authorized to use the NAF_ID, as indicated by step 4.1 in FIG. 2. The NAF then sends an authentication request including the B-TID and the NAF_ID to the BSF, as indicated by step 4.2 in FIG. 2.

On receipt of the authentication request, the BSF looks up the master key Ks using the B-TID and the BSF derives the application specific key Ks_NAF based on Ks and the NAF_ID supplied by the NAF. This step is illustrated as step 5) in FIG. 2. The BSF sends an authentication answer including the Ks_NAF back to the NAF, as indicated by step 6) in FIG. 2. The BSF may also include other information, such as the bootstrapping time and the lifetime of the key, in the authentication answer to the NAF. If the key identified by the B_TID is not available at the BSF, the BSF will indicate this in a reply to the NAF and the NAF will then send a bootstrapping renegotiation request to the UE.

The NAF and the UE now both know the value of Ks_NAF and they can use that key to protect communication (step 7) between the NAF and the UE over reference point Ua.

When deploying sensors or constrained (M2M) devices including both wireless and wired devices, a user will in many cases want to control and manage the wireless devices through some centralized point, e.g. a web service. Especially when deploying multiple sensors, the need for such a management portal becomes important to make the management scalable with the increase in the number of devices. The challenge is then how to get the devices to register at that portal so they can be managed through it. GBA provides a mechanism that can be used for this purpose, at least when the M2M devices are provided with 3GPP credentials, e.g. by way of conventional SIM cards (UICC) or embedded UICCs (eUICC). The following discussion aims to present a mechanism for constrained M2M devices that employs GBA to securely bootstrap devices regardless of their support for HTTP and TCP. More particularly, this mechanism relies upon a gateway (wireless in the examples described here but also potentially wired) that operates as an HTTP proxy. For extremely constrained devices without routing capabilities, HTTP and TCP, the benefits are twofold. Firstly, the constrained devices can securely discover the wireless gateway via the operator Bootstrapping Server Function (BSF). Secondly, devices can use shared secrets with application servers (NAFs) on the Internet, thereby ensuring end-to-end integrity and confidentiality in the presence of gateways and other intermediaries. In addition, for all devices served by a gateway (HTTP proxy), it is possible to verify that the devices are served by an authorized gateway.

The approach presented here uses an M2M device's 3GPP credentials and GBA in an optimal way to provide end-to-end confidentiality and integrity with any layer 2/3 protocol that is used within the constrained network. The 3GPP bootstrapping mechanism is also used to enable the resource-constrained devices to securely discover a gateway which can act as a bit pipe for data sent to and from the devices.

Figure 3:
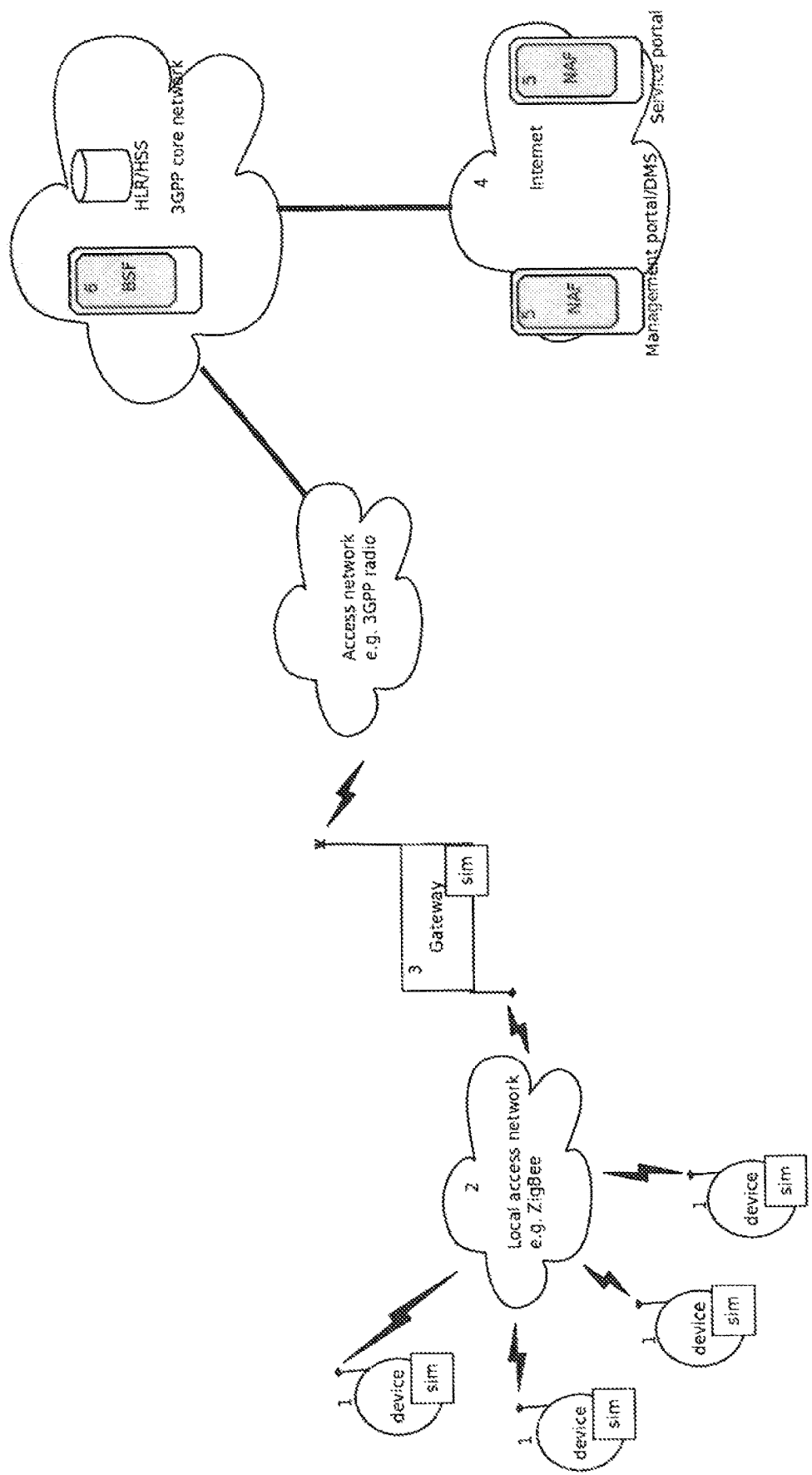
FIG. 3 illustrates schematically an Internet-of-Things architecture including multiple M2M devices.

FIG. 3 illustrates schematically an Internet-of-Things (IoT) architecture in which a number of M2M devices 1 with 3GPP credentials (e.g. on UICC or eUICC) are connected via a local access network 2 through a gateway (GW) 3 to an access network 7 such as a 3GPP radio access network. The local access network 2 may for example be any suitable access network, ZigBee or WLAN or network using a lightweight protocol such as for example; Bluetooth, Bluetooth low energy, Wifi, Weightless, Dash7, NFC, RFID, visible tight communication, Infrared communication. By way of example, the following discussion assumes a ZigBee device broadcast network. Of course, the local access network 2 could very well rely upon some other MAC layer technology with broadcast/multicast layer, or the steps described herein could also be used on top of a routing protocol or application layer protocol such as Constrained Application Protocol (CoAP).

FIG. 3 further illustrates two network-based entities that are configured to operate as Network Access Functions (NAFs) 5 within the GBA architecture, as well as a Bootstrapping Server Function 6. It is assumed here, by way of illustration, that the BSF is operated within a 3GPP core network, whilst the NAFs are operated within a service network, such as a network operated by the owner of the M2M devices 1, with this corporate network being coupled to the Internet 4. Whilst FIG. 3 illustrates the NAFs as being located within the public network, it is equally possible that one or both may be located with the operator (3GPP) network.

The procedure described below relies upon the GW 3 having an identity and a proof of owning that identity, e.g. a certificate. On the network side there is a connectivity management service ("Service portal") and a device management service (DMS). The owner/user of the devices gets subscriptions for the devices from the connectivity management service (possibly via a web page of an operator) and manages his devices using the DMS. In the illustration of FIG. 3, a NAF is implemented both within this DMS and within the Service portal, but the Service portal can also be without the NAF functionality. A user might for example purchase one hundred sensor devices, and obtain the information needed to enroll the devices as "subscribers" of a 3G or 4G operator's network from the manufacturer or the retailer, e.g. in a text file. The user registers the devices with the operator to get 3GPP subscriptions for each device via the operator's operator/connectivity management service (CMS); this can include providing device identities of the devices to the operator. The subscriptions are either provided as SIM cards which are inserted into the devices or as remotely managed subscriptions such as eUICCs or downloadable USIMs as described in 3GPP TR 33.812 (version 9.2.0 2010 Jun. 22). In addition, the user creates an account in a device management service to manage the devices.

When the user has registered the devices with the operator's CMS and has obtained the 3GPP credentials for the devices, he also informs the connectivity management service (possibly through the operator, e.g. via the web page where the subscriptions are ordered) of the identity of the device management service (DMS) that these devices will be using, e.g. the URL of the DMS. The operator can store this information together with information about the subscription, e.g. in the GBA User Security Settings (GUSS) that are stored in the Home Subscriber Server (HSS) in the operator's network. Optionally, the user can additionally store a username for each device (also stored in GUSS) to be used in the DMS.

Within the DMS, the user stores information about the devices, e.g. serial numbers or other identity information (e.g. received from a retailer or manufacturer), if usernames have been stored in the GUSS in the HSS, then these usernames can be used to register the devices in the DMS. The user can optionally store a list of accepted GWs that are allowed to serve the devices (this can be done as a general list or separately for each device). The reason for storing accepted GWs at the DMS instead of the CMS is that the CMS is not intended to be actively used by the user, while the DMS is a user portal for managing the user's devices. Particularly for the case where there is no initial list of accepted GWs, the user will have to manually connect to the service to check which GWs are used and make decisions on how to react (e.g. to GW attachment by a device). This type of functionality does not sit naturally with the functionality of the CMS and is best implemented within the DMS.

Figure 4:
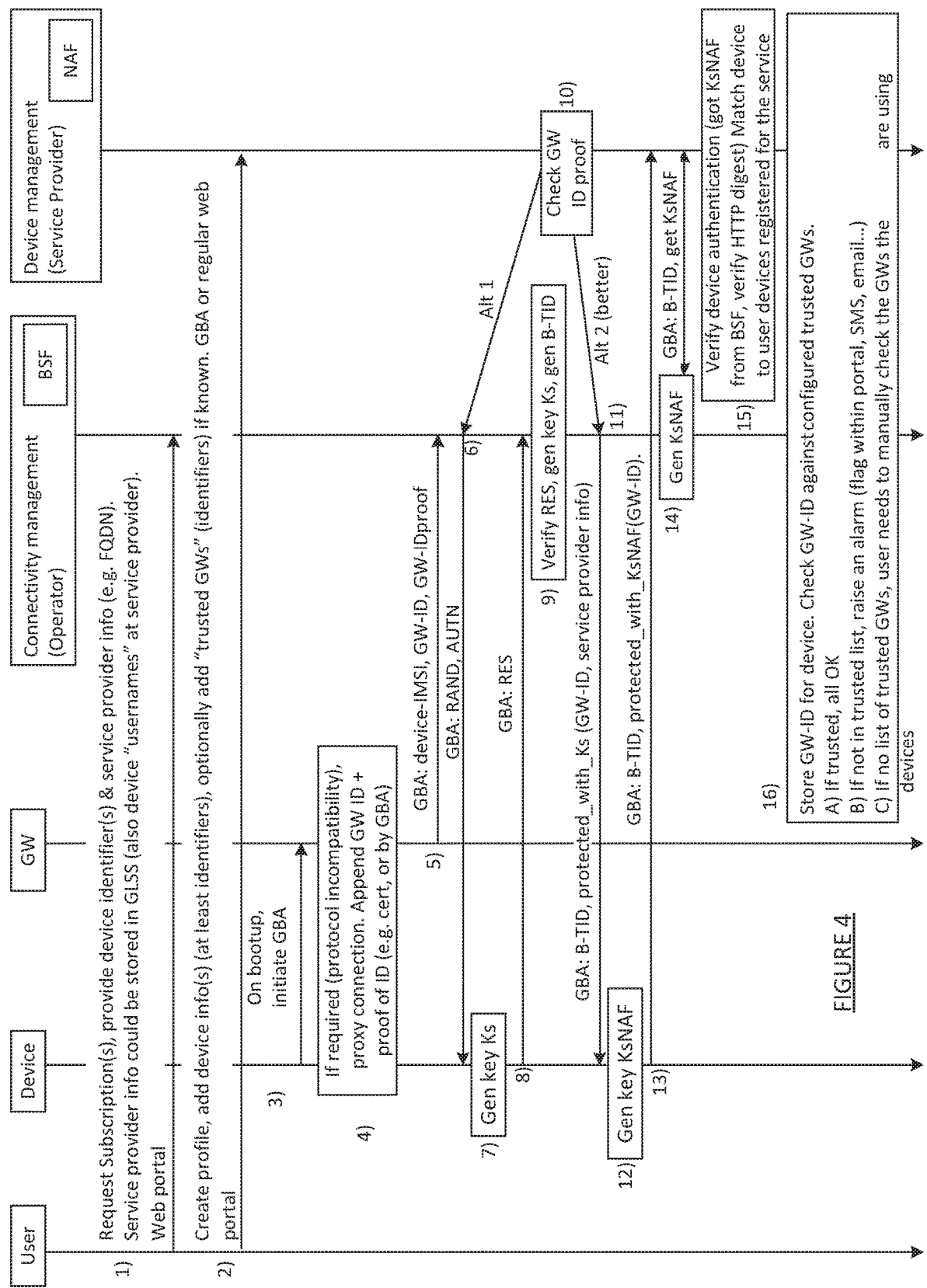
FIG. 4 illustrates a GBA-based procedure for establishing a secure session between a wireless (M2M) device and a Device Management Service provider and which incorporates novel gateway identity handling and authentication.

FIG. 4 illustrates the procedure for configuring and operating M2M devices within the architecture of FIG. 3, where the M2M device is denoted "Device", the device owner is referred to as "User", and other entities are as discussed above. Steps 1) and 2) are associated with the configuration process discussed in the previous paragraph.

When an M2M device has been installed and turned on, it will try to find some local network access to obtain connectivity. This network connectivity discovery can be based on e.g., IPv6 Router Advertisements (RA) or Dynamic Host Configuration Protocol (DHCP). The device will attempt to bootstrap when it is switched on or when, for example, the user presses a reset button or when batteries are replaced etc. The device scans the radio interface for available GWs and attaches to one of them. [The available GWs can be discovered, for example, using multicast DNS (mDNS) or from RA/DHCP options.] Next, the M2M device initiates GBA bootstrapping towards the BSF in the home operator's network (FIG. 4, step 3). The BSF information can be stored on the SIM card (or, e.g. eUICC, softSIMN/TRE, or other subscriber identity module formats, or as a USIM) or the device can query the operator's core network for information concerning the BSF service.

The GW acts as an HTTP proxy, intercepting the GBA bootstrapping message and appending its identity (that is the identity of the GW, GW-SD) and proof of that identity (GW-IDproof, e.g. a certificate and/or signature for a public-key) to the message (FIG. 4, step 4) before forwarding it to the BSF (FIG. 4, step 5). This gateway identity can be a public-key which can later be used by the M2M device to securely connect to the GW. Additionally, to prevent repeated transmission of the gateway t identity and its proof from the gateway to the BSF and having the BSF check the identity every time, the gateway may establish an IPSecC tunnel or a long lived SSL/TLS connection towards the BSF (which the BSF will agree to after the GW identity has been verified fey the BSF). For future devices connecting through this GW to the BSF, the BSF will just observe that the messages are received via the IPsec tunnel (or SSL/TLS) and take this as implicit authentication of the GW.

An alternative approach to ensuring security would be that the GW uses a Cryptographically Generated Address (CGA) for communication with the BSF. The GW would then not have to use a certificate to prove its identity.

The BSF performs regular GBA related tasks, and in addition stores the identity and proof of identity of the GW. The BSF can at this point, or before sending the B-TID (an identifier for the bootstrapping run) to the device (a few steps later), verify the identity provided by the GW When the identity has been verified, the IPsec tunnel (or SSL/TLS) can be set up between the BSF and the GW. The BSF replies to the device via the GW with the AUTN and RAND parameters as specified for GBA (FIG. 4, step 8), and the device calculates the key Ks and the result RES (FIG. 4, step 7). The parameter RES is sent from the M2M device back to the BSF (FIG. 4, step 8) which checks that it matches the expected result (FIG. 4, step 9). If the checks are positive, t the BSF can (if not done earlier) check the GWs identity based on the identity proof provided earlier (FIG. 4, step 10).

At this point, the BSF replies back to the device according to standard GBA operation, giving the B-TID to be used (FIG. 4, step 11). In addition, the BSF includes in the message the DMS information ("service provider info", e.g. URL) stored in the GUSS for the device (although this information could also be stored locally in the BSF), and the GW identity, GW-ID. The GUSS is obtained by the BSF from the HSS, although this step is not illustrated in FIG. 4. The DMS information is only included if the bootstrapping initiation request included a GW identity, as this is an indication that the device has not previously bootstrapped via the GW and thus might not have all the needed information to bootstrap to the DMS. As an alternative the DMS information could be included in all bootstrapping runs with the BSF, but that would result in unnecessary overhead in many cases.

In the case where an IPsec tunnel (or SSL/TLS) is used to avoid the need to re-authenticate the GW, if such a tunnel already exists, the GW can send a subsequent GBA bootstrapping message through the tunnel even if the sending device has not yet registered with the GW. The BSF will note (from this message received via the IPsec tunnel or SSL/TLS) that the reply should contain the GW identity. In the case that a device has already performed the solution presented here and has previously registered itself with the GW, but needs to use the BSF for a new GBA session, the GW will identify the device as a registered device and forward the GBA message to the BSF "outside" the IPsec tunnel (or SSL/TLS). In this way, the BSF knows that it does not have to attach the GW identity or the DMS information to the reply message since the device already knows its DMS and has registered with the GW. These two additional pieces of information, DMS info and GW identity, should be protected using the key Ks (integrity and/or confidentiality protected).

The choice of when to do the authentication check on the GW identity (at the BSF) is based upon a decision as to when the BSF should do the extra computation required and how it should react to a fake identity. If the BSF will end the communication as a result of invalid proof of identity, then checking the identity as soon as possible is reasonable to avoid doing extra (unnecessary) bootstrapping work. According to an alternative approach, an invalid proof results in the identity of the GW not being communicated to the device, despite the bootstrapping being completed as required. In this case, if the check on the GW identity is performed before completing the GBA bootstrapping, an attacker (sitting between the GW and the BSF) could send bogus requests to deplete the BSF resources with GW identity checks. On the other hand, if the check on the GW identity is performed after bootstrapping, this only gives an attacker the same DoS opportunity as is presented by merely dropping the bootstrapping requests.

When the M2M device receives the B-TID and service provider info from the BSF (FIG. 4, step 11), it will use the DMS information as the DMS/NAF Fully Qualified Domain Name (FQDN) and connect to the DMS/NAF as in regular GBA procedures, i.e. the device will generate the key KsNAF based on the DMS FQDN (FIG. 4, step 12) and will establish a secure connection with the DMS using KsNAF and the B-TID (FIG. 4, step 13), This involves a GBA exchange between the NAF and the BSF (FIG. 4, step 14) in order to provide the NAF with KsNAF. The NAF is able to authenticate the M2M device using previously registered device data (FIG. 4, step 15).

As part of the HTTP digest run, or after a secure connection has been established, the device (securely) communicates the previously authenticated GW identifier to the DMS. If the DMS maintains a list of trusted GWs, the DMS can check if the given GW identity is trusted (FIG. 4, step 16) and, if so, reply with an OK message to the M2M device.

At this stage the M2M device can establish a secure connection with the GW based on the verified and approved GW identity. For example, if the GW identity is a public-key, the M2M device may perform a Diffie-Hellman exchange to set up shared secrets and communicate securely with the GW. This step also serves as a form of registration of the device to the GW.

After a device has been registered at the GW, the GW knows not to attach its identity and proof of identity to future GBA bootstrapping initiation messages (sent to the BSF) or, if the IPsec tunnel (or SSL/TLS) variant is used, the GW knows not to send future bootstrapping messages through the tunnel. Of course, if the device de-registers with the GW, the GW will again start attaching GW identity information to the GBA bootstrapping messages (or send the messages through the previously established tunnel).

An alternative implementation involves operating the GW as a NAF in order to ensure a secure connection to a "trusted" GW. In this case, the GW/NAF communicates its FQDN to the BSF and the BSF replies with both the FQDN of the DMS and the GW/NAF. The M2M device can, after GBA bootstrapping to the GW/NAF, also bootstrap to the DMS and provide the GW/NAF information for validation. Alternatively, the device could first bootstrap with the DMS and provide the GW/NAF FQDN for validation, and after that perform bootstrapping with the GW/NAF using GBA.

In yet another alternative, when GBA is not used for device authentication, a more generic bootstrapping server is used in place of the BSF, while the authentication to the DMS is done using standard methods, e.g. username/password, in this scenario, the device and the bootstrapping server share a secret key or, alternatively, the device has the public key or the public key certificate of the bootstrapping server. The device connects to the bootstrapping server through the GW, which, as above, attaches its identity and proof of identify to the message. The device can optionally be authenticated by the bootstrapping server. The bootstrapping server verifies the GW identity just as in the GBA case. Based on the identity of the device, the bootstrapping server replies to the device with information about the DMS of the device. This information is stored in the bootstrapping server in a device ID to DMS information mapping, so the bootstrapping server can look up the DMS information based on the device identity. The GW identity is attached to the message just as in the GBA case described above. The reply should be protected either by security credentials set up during authentication, by a secret key of the device, or by using the private key of the bootstrapping server.

Based on the received DMS information, the device can now connect to the DMS. The device authenticates itself to the DMS using its secret key which has been pre-shared with the DMS. Alternatively, the device might have a public-private key pair or a public key certificate that can be used for device authentication to the DMS. The device communicates the GW identity to the DMS Just as in previous scenarios, and the GW identity is authorized by the DMS.

Figure 8:
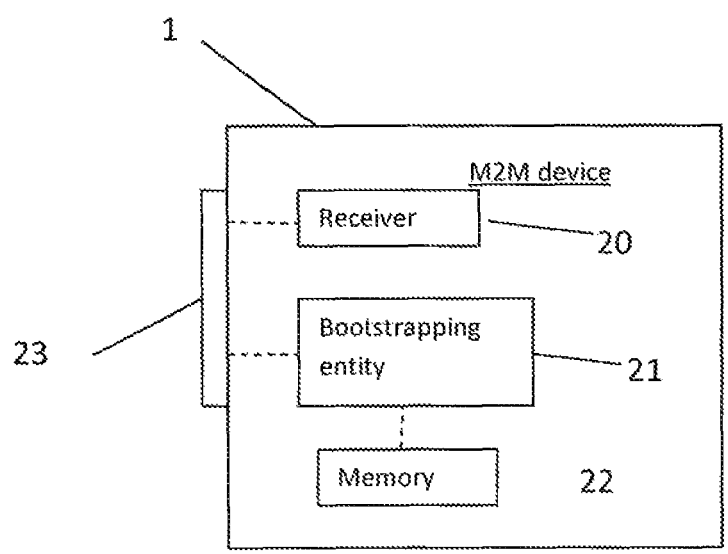
FIG. 8 illustrates schematically a device suitable for use with the approach of FIG. 8.

FIG. 8 is a flow diagram further illustrating the method of establishing a secure connection between a device and a network-based entity via a wireless across gateway. The assumption is that the device and a network-based bootstrapping server have a pre-established trust relationship, e.g. shared 3GPP credentials. The method comprises sending (S3) a bootstrapping initiation request from the device to the wireless access gateway. Upon receipt of the bootstrapping initiation request at the wireless access gateway, the request is forwarded (S4) to the bootstrapping server. The bootstrapping server receives the request (S5), obtains (S5) a reference to the network-based entity, and sends (S7) a response, including the reference, to the device via the wireless access gateway. The reference to the network-based entity is used to securely authenticate the device to the network-based entity, whereupon an identity of the wireless access gateway is sent (S8) to the network-based entity. The identity is used to authorise (S9) the device to use the wireless access gateway.

The method further comprising sending (S4), from the gateway to one or both of the bootstrapping server and the network-based entity, a proof of identity for the wireless access gateway identity. The proof of identity is used (S6) to authenticate the wireless access gateway identity at the bootstrapping server and/or the network-based entity.

Figure 7:
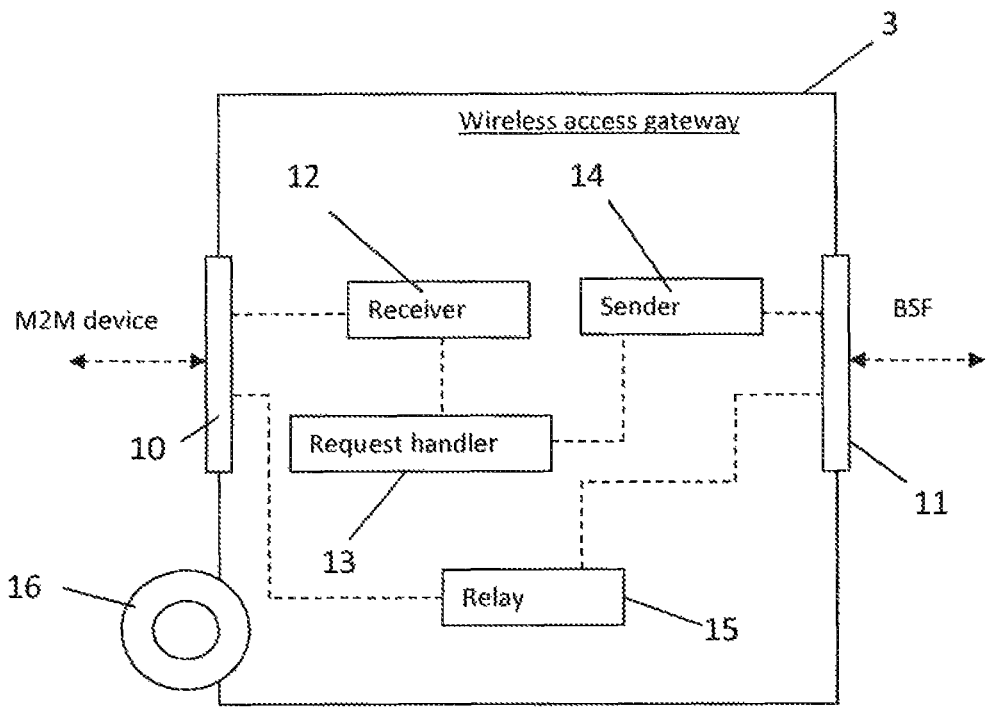
FIG. 7 illustrates schematically a gateway suitable for use with the approach of FIG. 8.

Referring now to FIG. 7 there is illustrated a wireless access gateway comprising a first interface 10 enabling wireless communication with a device, and a second interface 11 enabling communication with a bootstrapping server. The gateway further comprises a receiver 12 for receiving from said device, via said first interface 10, a bootstrapping initiation request, and a request handler 13 for including in said request a gateway identity and a proof of that identity. Additionally, there is provided a sender 14 for sending the request to said bootstrapping server via said second interface 11, and a relay 15 for relaying a response, received from said bootstrapping server via said second interface, and containing a pointer to a network-based entity and a wireless access gateway authentication result, to said device via said first interface 10. FIG. 7 also illustrates a software/memory component 18 on which is stored code for implementing certain required functionality.

Referring to FIG. 3, there is illustrated a device comprising a memory 22 for storing 3GPP credentials. The device may be, for example, a resource constrained M2M device such as a sensor. The device comprises a wireless Interface 23 for communicating wirelessly with a wireless access gateway using non-HTTP protocols (and optionally non-TCP and non-IP protocols), and a bootstrapping entity 21 for using said wireless interface to obtain a reference to a network-based entity from a bootstrapping server, using said 3GPP credentials, and for using the received identity to establish a secure connection with a network-based entity. The exemplary device further comprises a receiver 20, for receiving via said wireless interface, a wireless access gateway authentication indication from either said bootstrapping server or said network-based entity. FIG. 8 also illustrates a software/memory component 24 on which is stored code for implementing certain required functionality.

Figure 9:
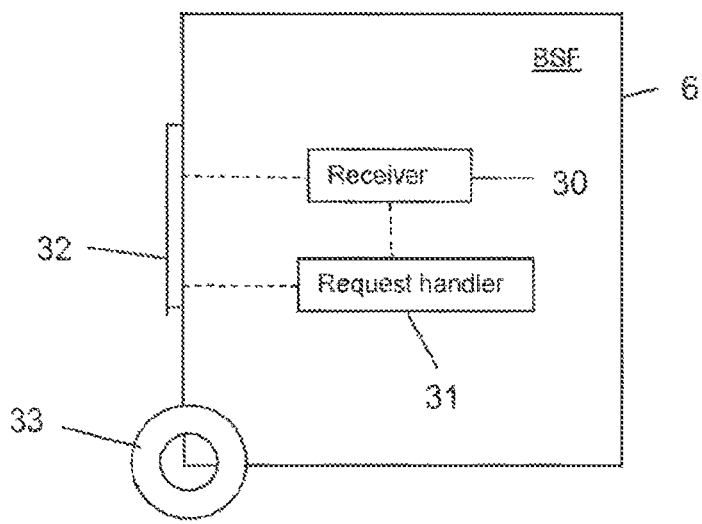
FIG. 9 illustrates schematically a Bootstrapping Server Function for use with the approach of FIG. 6.

Referring to FIG. 9 there is illustrated a server configured to operate as a Bootstrapping Server Function within a Generic Bootstrapping Architecture and comprising an interface 32 for communicating with a wireless access gateway acting as a wireless access gateway for devices. The bootstrapping server comprises a receiver 30 for receiving from said wireless access gateway, via said interface, a GBA bootstrapping initiation request relating to a given device containing an identity of said gateway and a proof of that identity. There is also provided a request handier 31 for authenticating the gateway identity using the proof of identity and for notifying the device of a gateway authentication result, via said interface and said wireless access gateway, as part of a GBA exchange. FIG. 9 also illustrates a software/memory component 33 on which is stored code for implementing certain required functionality.

Figure 10:
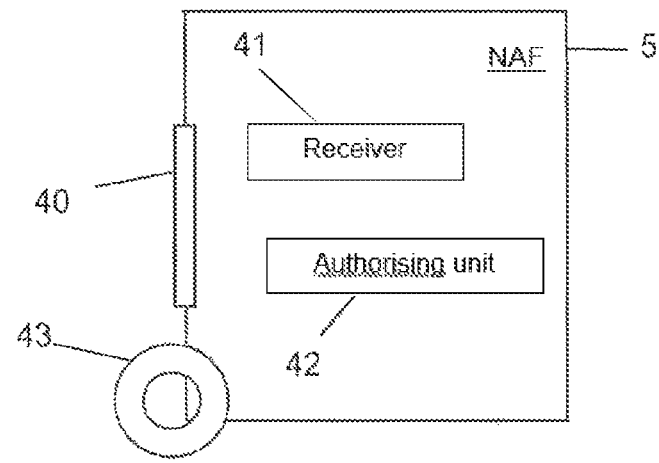
FIG. 10 illustrates schematically a Network Access Function suitable for use with the approach of FIG. 6.

FIG. 10 illustrates a network-based entity operating as a Network Access Function within a Generic Bootstrapping Architecture. The entity comprises an interface 40 for communicating with a wireless access device acting as a wireless access gateway for devices, it comprises a receiver 41 for receiving via said interface, an identity of the wireless access gateway, and an authorising unit 42 for authorising the gateway for use by the device based on said identity. FIG. 10 also illustrates a software/memory component 43 on which is stored code for implementing certain required functionality.

Figure 11:
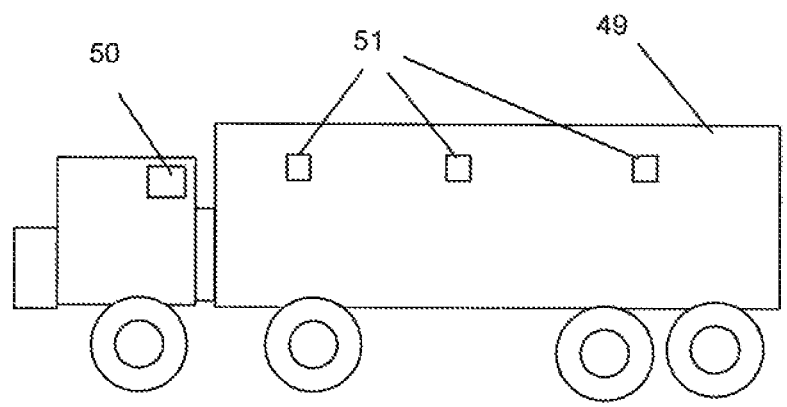
FIG. 11 illustrates schematically a vehicle comprising a plurality of wireless devices and a wireless access gateway.

FIG. 11 illustrates schematically a vehicle 49 (in particular a lorry or truck) comprising a wireless access gateway 50 as described above, and a plurality of wireless devices 51, also as described above.

Potential Error Cases and Attacks

If the DMS is provided with a pre-configured list of accepted GWs, and the GW identity provided by an M2M device in the bootstrapping message is not found in the list, an error should be reported. The DMS could inform the device that the identity is not accepted, and also optionally provide a list of accepted GW identities. At this stage the M2M-device could try to find a new, accepted, GW to attach to (the GW should have a way of proving its identity so it should be sufficient to provide the accepted identities to the M2M device), if the original GW discovery resulted in more than one GW option, the M2M device could simply go through the list of options one-by-one. The device could also send IPv6 Router Solicitation (RS) messages to discover new GWs or perform mDNS discovery. In addition, if the original GW was not accepted, the DMS could raise a notification flag indicating the erroneous GW, and possibly send a notification, such as SMS or e-mail, to the owner indicating that there are unknown GWs in his network. The flagging of the unknown/untrusted GW could be used also for later manually accepting new GWs by the user.

If the BSF cannot verify the provided identity based on the identity proof (or if none was given by the GW), the BSF will not attach the GW identity to the reply message containing the B-TID. In this case the device will only receive the URL/FQDN of the DMS and connect to it: it will not provide any GW information to the DMS. In this case the DMS can, if available, provide the list of accepted GWs to the M2M device which can try again to connect to an accepted GW. If no list of GWs is available at the DMS the user will see that the M2M device does not have a GW associated with it and will determine that something is wrong (either direct connection to the Internet, or GW identify unknown). In a possibly worst case scenario, the user must manually re-configure/attach the device to an acceptable GW.

A likely point of attack into an M2M/IoT network involves inserting a fake GW into the network. In this case, and given the GBA-based approach presented here, such an attack can only achieve, in addition to denial-of-service, the modification of the GW identity and proof of GW identity sent to the BSF. The further information exchanged (between the M2M node and BSF and NAF/DMS) will be protected by either Ks or KsNAF. The error cases described in the previous paragraph should however address any potential threats arising from this attack: if the GW identity is not authenticated the M2M device will not receive the (secured) identity of the GW from the BSF, but instead will receive it from the DMS or from the user by manual configuration; If the GW identity is authenticated but the GW is not accepted by the user, the DMS will inform the M2M device of acceptable GWs and the device will try to connect to an accepted GW. It may attempt to do this by performing a new GBA bootstrapping procedure, through the new GW, with the BSF as described above, re-checking the identity of the new GW, or it may use the received identity (e.g. public key) to force the GW to prove that it owns the ID/public key. This second approach requires the device to perform the checking of the GW identity.

Very Resource Constrained M2M Devices

The proposed GBA-based solution is also suited to cases where the M2M devices are very (resource) constrained and cannot use HTTP and TCP. In such cases, a constrained M2M device will broadcast a request to perform a GBA bootstrap along with its user identity, which could be an IMPI or a temporary identity. This message will also include the operator information or alternatively directly provide the address of the BSF. Although not conforming to the GBA protocols, this broadcast request represents a bootstrapping request.

Upon reception of the broadcast bootstrapping request, the GW then creates an HTTP(s) connection to the BSF using either information provided from the operator or the BSF address if that is included in the broadcast bootstrapping request. The GW attaches its identity (which could be the public-key, MAC address, IP address or Cryptographically Generated Address (CGA) etc.) and proof of the identity (either in the form of a certificate or a signature over the MAC etc.) to the GBA bootstrapping request that it sends to the BSF. The BSF then responds with a challenge containing the RAND and AUTN which are required for 3GPP authentication (AKA, Authentication and Key Agreement). The GW forwards this challenge to the constrained M2M device (CD). The information the GW forwards to the CD includes RAND and AUTN, and in addition all other parameters the CD requires to solve and answer the challenge, e.g. for HTTP digest (RFC 2617) the opaque, the realm parameter, nonce and QOP parameter and possibly the URI of the BSF.

Figure 5:
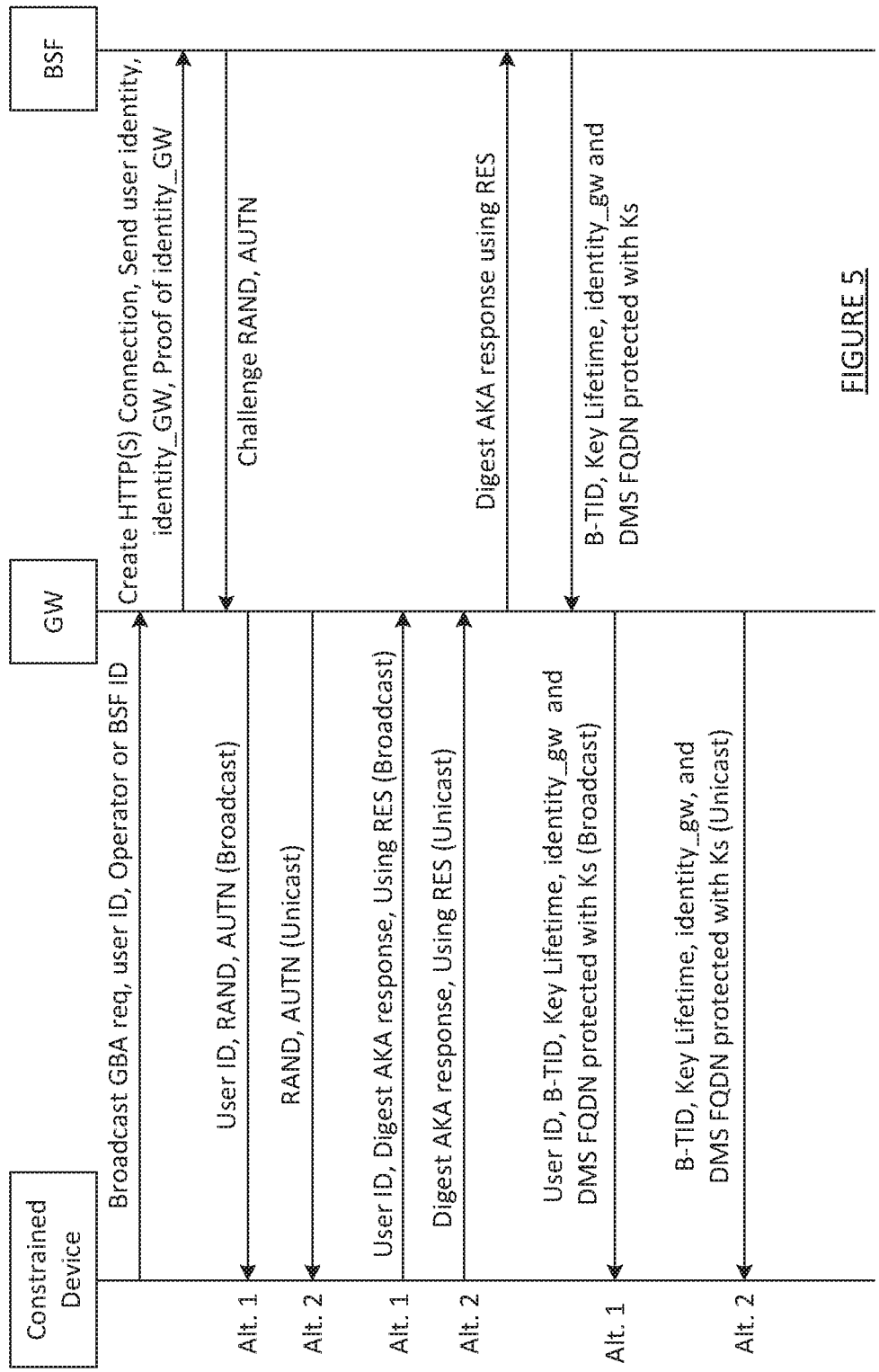
FIG. 5 illustrates two alternative procedures for establishing a shared key between an M2M device and a BSF.
Figure 6:
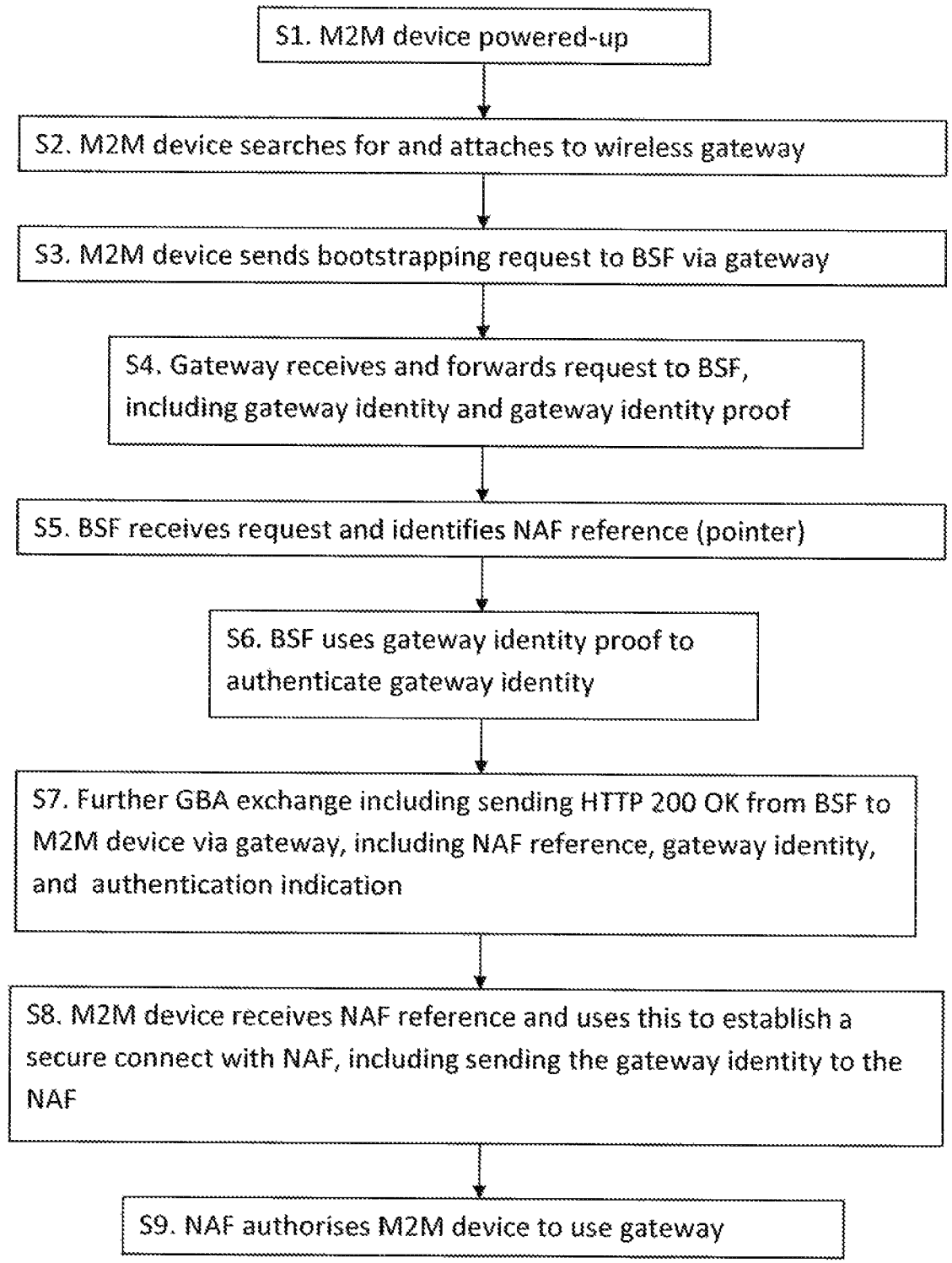
FIG. 6 is a flow diagram further illustrating an approach to establishing secure connection between a wireless (M2M) device and a network-based entity.

The procedure is further illustrated in FIG. 5 which shows in particular two alternative approaches. The communication from the GW to the CD can either be unicast (Alt.2), using the source address of the initial broadcast message of the CD, or broadcast (Alt.1). If the traffic is broadcast, the original user identity of the CD is added to the message. The form of communication between CD and the GW can be switched from broadcast to unicast at any point after the initial broadcast message is sent. However, with broadcast communication the constrained network does not necessarily even need to be able to run a routing protocol but it is sufficient that the network can flood the GBA messages to and from the GW, reaching also the CD(s).

Upon receipt of the challenge forwarded by the GW, the CD calculates the Digest AKA response and sends it to the GW. The GW then creates the GBA response message to the BSF based on the information received from the CD and sends it to the BSF. [The BSF can assert the GW identity just as in the case described earlier, either when it has received it or when it receives this response message.]

The BSF responds with the B-TID, the identity of the GW and the FQDN of the DMS. The GW identity and the DMS FQDN are both protected using the Ks (secret key of the GBA bootstrapping run). The GW then forwards this message to the CD. The constrained device can now decrypt the GW identity and the DMS FQDN. It can also generate the KsNAF based on the DMS FQDN and use it, together with the B-TID, to securely communicate end-to-end (using the GW as HTTP proxy) to the DMS, and to check the GW identity with the DMS.

In a constrained device it might be that the memory is not big enough to fit both the GBA related logic and the routing stack/application layer stack etc. Using the approaches described here, it is possible to first use the memory for doing the GBA bootstrapping, then save the generated B-TID and Ks and KsNAF and remove the aforementioned logic from the memory whilst loading the routing/application layer logic. If the CD needs to run a new bootstrapping run with the BSF, e.g. because the lifetime of Ks has run out, it can again re-load the GBA related logic from, e.g. flash memory, if the CD wants to connect to another NAF it can calculate a new KsNAF based on Ks and the FQDN of the new NAF and use the existing B-TID.

In the above example scenarios, during the bootstrapping phase when the M2M device does GBA to find out the DMS FQDN and determines from the DMS the correct GW to be used, it does not matter which GW the device connects through. Rather, it is the connectivity that is important. If the GW is under the control of an attacker, the only harm that can be done is a denial-of-service. Once the device has connected to the DMS if will either automatically, or by manual configuration by the user, receive information about which GW to connect to after which the device can securely connect and register with the correct GW.

It will be appreciated by the person of skill in the art that various modifications may be made to the above described embodiments without departing from the scope of the present invention.

REFERENCES 1. 3GPP TS 33.220, v 12.1.0 2013 Jun. 27
2. Luis Barriga, Ben Smeets, and Krister Sallberg. "M2M Remote-Subscription Management." Ericsson Review 1 (2011).
3. 3GPP TS 33.102, v11.5.0. 2012 Dec. 21
4. IEEE 802.15.4
5. 3GPP TR 33.812, v 9.2.0, 2010 Jun. 22

The invention claimed is:

1. A method of establishing a secure connection between a device and a network-based entity via an access gateway, where the device and a network-based bootstrapping server have a pre-established trust relationship, the method comprising:
sending a bootstrapping initiation request from the device to the access gateway;
upon receipt of the bootstrapping initiation request at the access gateway, forwarding the bootstrapping initiation request to the bootstrapping server;
receiving the bootstrapping initiation request at the bootstrapping server, obtaining a reference to the network-based entity, and sending a response, including the reference, to the device via the access gateway;
using the reference to the network-based entity at the device to securely authenticate the device to the network-based entity, and sending from the device an access gateway identity of the access gateway to the network-based entity and using that access gateway identity of the access gateway at the network-based entity to authorise the device to use the access gateway, and
sending, from the access gateway to one or both of the bootstrapping server and the network-based entity, a proof of identity of the access gateway identity, and using the proof of the identity of the access gateway identity to authenticate the access gateway identity at the bootstrapping server and/or the network-based entity.

2. The method according to claim 1, wherein said bootstrapping server is operated as a Bootstrapping Server Function, BSF, of a Generic Bootstrapping Architecture, GBA, and said network-based entity is operated as a Network Application Function, NAF, of the GBA, and said bootstrapping initiation message is a GBA initiation request.

3. The method according to claim 2, wherein said device is pre-provisioned with 3GPP credentials for use in a GBA procedure.

4. The method according to claim 1 and comprising, upon receipt of said bootstrapping initiation request at the access gateway, including an access gateway identity and a proof of the identity of the access gateway identity in the bootstrapping initiation request prior to forwarding the bootstrapping initiation request to the bootstrapping server.

5. The method according to claim 4 and comprising authenticating the access gateway at the bootstrapping server using the received access gateway identity and proof of identity of the access gateway identity, and notifying the device of the outcome of the authentication.

6. The method according to claim 5 and comprising notifying the device of the outcome of the authentication by including a notification in a Hypertext Transfer Protocol, HTTP, 200 OK response that also includes said reference and the access gateway identity.

7. The method according to claim 6 and comprising securing the notification and, optionally the reference and gateway identity, with the GBA key Ks.

8. The method according to claim 6, wherein said bootstrapping server is operated as a Bootstrapping Server Function, BSF, of a Generic Bootstrapping Architecture, GBA, and said network-based entity is operated as a Network Application Function, NAF, of the GBA, and said bootstrapping initiation message is a GBA initiation request, and said notification further including a B-TID for the GBA session.

9. The method according to claim 8, wherein said step of using the reference to the network-based entity to securely authenticate the device to the network-based entity comprises determining a Fully Qualified Domain Name, FQDN, for the network-based entity and using the contact address to establish a shared session key between the device and the network-based entity.

10. The method according to claim 6 and comprising securely sending the access gateway identity from the device to the network-based entity to enable the network-based entity to perform said authorisation of use of the access gateway.

11. The method according to claim 5 comprising, upon successful authentication of the access gateway at the bootstrapping server, establishing a secure tunnel between the access gateway and the bootstrapping server.

12. The method according to claim 2 comprising performing Authentication and Key Agreement between the device and the bootstrapping server using Hypertext Transfer Protocol, HTTP, over a TCP connection established between the access gateway and the bootstrapping server, including relaying challenge, response and HTTP 200 OK messages between the access gateway and the device over a non-HTTP link in order to provision the device with a session key for use with said network-based entity acting as a Network Application Function, NAF.

13. The method according to claim 1, wherein said device is a wireless device and/or said access gateway is a wireless access gateway.

14. An access gateway comprising a first interface enabling communication with a device, and a second interface enabling communication with a bootstrapping server, the access gateway further comprising:

a receiver configured to receive from said device, via said first interface, a bootstrapping initiation request;

a request handler configured to include in said bootstrapping initiation request an access gateway identity and a proof of identify of that access gateway identity;

a sender configured to send the bootstrapping initiation request including the access gateway identity and the proof of identity of that access gateway identity to said bootstrapping server via said second interface; and a relay configured to relay a response to the bootstrapping initiation request, received from said bootstrapping server via said second interface, to said device via said first interface, the response containing a pointer to a network-based entity, and an access gateway authentication result.

15. The access gateway according to claim 14, wherein said first interface is an interface adapted to communicate using non-Hypertext Transfer Protocol, HTTP, protocol(s) and said second interface is HTTP interface adapted to communicate using HTTP protocol(s), and the access gateway is configured to operate as an HTTP proxy between the device and the bootstrapping server.

16. The access gateway according to claim 15, the access gateway being configured to participate in a Generic Bootstrapping Architecture, GBA, exchange with said bootstrapping server, wherein said bootstrapping initiation request sent from the access gateway to the bootstrapping server is a GBA initiation request and said response is a HTTP 200 OK response including a session Bootstrapping Transaction Identifier, B-TID.

17. The access gateway according to claim 14, wherein said proof of identity of that access gateway identity is a certificate or signature generated by the access gateway using a private key of a public-private key pair.

18. The access gateway according to claim 14, the access gateway being a wireless access gateway.

19. A server configured to operate as a Bootstrapping Server Function within a Generic Bootstrapping Architecture, GBA, and comprising:

an interface configured to communicate with an access gateway acting as an access gateway for devices, a receiver configured to receive from said access gateway, via said interface, a GBA bootstrapping initiation request relating to a device containing an access gateway identity of said access gateway and a proof of identity of that access gateway identity, a processor; and a memory coupled to the processor, the memory comprising computer readable program code embodied therein that is executable to cause the processor to perform operations comprising:

authenticating the access gateway identity using the proof of identity of that access gateway identity and to notify the device of an access gateway authentication result, via said interface and said access gateway, as part of a GBA exchange.

20. The server according to claim 19, wherein the memory further comprises computer readable program code embodied therein that is executable to cause the processor to perform operations comprising including said gateway authentication result in a Hypertext Transfer Protocol, HTTP, 200 OK response of said GBA exchange.

21. The server according to claim 20, wherein the memory further comprises computer readable program code embodied therein that is executable to cause the processor to perform operations comprising securing the result, included in the HTTP 200 OK response, using a bootstrapping key.

22. A network-based entity operating as a Network Access Function within a Generic Bootstrapping Architecture and comprising:

an interface configured to communicate with an access gateway for devices, a processor, and a memory coupled to the processor, the memory comprising computer readable program code embodied therein that is executable to cause the processor to perform operations comprising:

sending to the devices one or more access gateway identities in the event a received access gateway identity is unauthorized or cannot be authorized, receiving, via said interface, an access gateway identity of the access gateway, and authorising the access gateway for use by the devices based on said access gateway identity being verified.

23. The network-based entity according to claim 22 wherein the operations further comprise authenticating said access gateway identity of the access gateway.

* * * * *